(12) United States Patent
Zhang et al.

(10) Patent No.: US 8,868,050 B2
(45) Date of Patent: Oct. 21, 2014

(54) INFORMATION OUTPUT METHOD AND DEVICE

(71) Applicants: Beijing Lenovo Software Ltd, Beijing (CN); Lenovo (Beijing) Co., Ltd., Beijing (CN)

(72) Inventors: Bo Zhang, Beijing (CN); Chunlei Zhao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 93 days.

(21) Appl. No.: 13/749,117

(22) Filed: Jan. 24, 2013

(65) Prior Publication Data

US 2013/0196641 A1    Aug. 1, 2013

(30) Foreign Application Priority Data

Jan. 31, 2012    (CN) .......................... 2012 1 0021862

(51) Int. Cl.
*H04M 3/42*    (2006.01)
*H04M 1/57*    (2006.01)
(52) U.S. Cl.
CPC ...................................... *H04M 1/57* (2013.01)

USPC .......................................................... 455/415
(58) Field of Classification Search
USPC ........ 455/415, 435.1, 405, 517; 370/331, 241
See application file for complete search history.

(56) References Cited

U.S. PATENT DOCUMENTS

2002/0058494 A1*    5/2002    Timonen et al. ............... 455/405
2008/0310370 A1*    12/2008    Kitani .......................... 370/331

* cited by examiner

*Primary Examiner* — Kiet Doan
(74) *Attorney, Agent, or Firm* — Harness, Dickey & Pierce, P.L.C.

(57) ABSTRACT

An information output method includes obtaining an identifier of a second communication terminal when a communication connection request is initiated to a second communication terminal or a communication connection request is received from the second communication terminal; determining whether the identifier of the second communication terminal satisfies a first preset condition; obtaining first associated information corresponding to the identifier of the second communication terminal according to the identifier of the second communication terminal, if the second communication terminal identifier satisfies the first predetermined condition; and outputting communication connection request prompt information and the first associated information to a display interface of the first communication terminal.

14 Claims, 6 Drawing Sheets

INFORMATION OUTPUT METHOD AND DEVICE

This application claims the priority of Chinese Patent Application No. 201210021862.3, entitled "INFORMATION OUTPUT METHOD AND DEVICE", filed with the Chinese Patent Office on Jan. 31, 2012, which is incorporated by reference in its entirety herein.

FIELD OF THE INVENTION

The present invention relates to the field of communication technology, particularly to an information output method and device.

BACKGROUND OF THE INVENTION

With development of the communication technology, communication terminals, especially mobile communication terminals such as various cell phones and smart phones, have already been necessary electronic products for people. Information can be transferred conveniently among users through various communication terminals.

When a user initiates a call request to or receives an incoming call request sent from a communication terminal used by another user through a communication terminal, normally a display interface of the communication terminal only displays basic information for the call such as a called telephone number or an incoming telephone number. However, in a general case, a communication connection can not be established immediately. Especially when a call request is initiated, a call waiting time is possibly very long, resulting in a waste of time. Therefore, how to employ sufficiently a communication connection procedure and connection establishment time to improve a user experience becomes an emphasis increasingly concerned by those skilled in the art. However, there is no such a technical solution that can employ sufficiently the communication time to improve the user experience.

SUMMARY OF THE INVENTION

In view of the above, the present invention provides an information output method and device to resolve the technical problem that time is not sufficiently employed when a call request is initiated so as to cause a waste of time.

The present invention provides a following technical solution to achieve the above mentioned object.

An information output method applied to a first communication terminal includes:

obtaining an identifier of a second communication terminal in the case that it is detected that a communication connection request is initiated to a second communication terminal or a communication connection request is received from the second communication terminal;

determining whether the identifier of the second communication terminal satisfies a first predetermined condition to obtain a first determination result;

obtaining first associated information corresponding to the identifier of the second communication terminal according to the identifier of the second communication terminal, if the first determination result indicates that the identifier of the second communication terminal satisfies the first predetermined condition; and outputting communication connection request prompt information and the first associated information to a display interface of the first communication terminal, in which the communication connection request prompt information is prompt information corresponding to the initiation of the communication connection request to the second communication terminal or the reception of the communication connection request from the second communication terminal.

Preferably, the determining whether the identifier of the second communication terminal satisfies a first predetermined condition to obtain a first determination result includes:

determining whether the identifier of the second communication terminal is stored to obtain the first determination result.

Preferably, if the first determination result indicates the identifier of that the second communication terminal does not satisfy the first predetermined condition, the method further includes:

outputting the communication connection request prompt information to the display interface of the first communication terminal, in which the communication connection request prompt information is prompt information corresponding to the initiation of the communication connection request to the second communication terminal or the reception of the communication connection request from the second communication terminal.

Preferably, the obtaining first associated information corresponding to the identifier of the second communication terminal according to the identifier of the second communication terminal includes:

determining a first corresponding relationship set stored in the first communication terminal, in which the first corresponding relationship set includes at least one corresponding relationship between a communication terminal identifier and associated information; and searching for the first associated information corresponding to the identifier of the second communication terminal according to the identifier of the second communication terminal and the first corresponding relationship set.

Preferably, the obtaining first associated information corresponding to the identifier of the second communication terminal according to the identifier of the second communication terminal includes:

obtaining a second corresponding relationship set stored in the first communication terminal, in which the second corresponding relationship set includes at least one corresponding relationship between a communication terminal identifier and a network identifier;

searching for a network identifier corresponding to the identifier of the second communication terminal according to the identifier of the second communication terminal and the second corresponding relationship set; and obtaining the first associated information corresponding to the network identifier according to the network identifier.

Preferably, after outputting communication connection request prompt information and the first associated information to a display interface of the first communication terminal, the method further includes:

determining whether an information acquiring request satisfies a second predetermined condition to obtain a second determination result, in the case that the information acquiring request is detected;

obtaining second associated information corresponding to the identifier of the second communication terminal according to the identifier of the second communication terminal or the first associated information, if the second determination result indicates that the information acquiring request satisfies the second predetermined condition; and outputting the second associated information to the display interface of the first communication terminal.

Preferably, the obtaining first associated information corresponding to the identifier of the second communication terminal according to the identifier of the second communication terminal includes:

obtaining an associated information set corresponding to the identifier of the second communication terminal according to the identifier of the second communication terminal; and selecting the first associated information from the associated information set in accordance with a preset rule.

Preferably, the method further includes:

determining whether a communication connection with the second communication terminal is established successfully; and if the communication connection with the second communication terminal is established successfully, outputting the first associated information to the display interface continuously and outputting communication procedure prompt information after the establishment of the communication connection with the display interface simultaneously.

An information output device applied to a first communication terminal includes:

a first detecting module configured to detect whether a communication connection request is initiated to a second communication terminal or whether a communication connection request is received from the second communication terminal;

a first obtaining module configured to obtain an identifier of a second communication terminal, if a detection result of the first detecting module is Yes;

a first determining module configured to determine whether the identifier of the second communication terminal satisfies a first predetermined condition;

a second obtaining module configured to obtain first associated information corresponding to the identifier of the second communication terminal according to the identifier of the second communication terminal if a determination result of the first determining module is Yes; and an output module configured to output communication connection request prompt information and the first associated information to a display interface of the first communication terminal, in which the communication connection request prompt information is prompt information corresponding to the initiation of the communication connection request to the second communication terminal or the reception of the communication connection request from the second communication terminal.

Preferably, the first determining module is configured to determine whether the identifier of the second communication terminal is stored.

Preferably, the output module is further configured to output the communication connection request prompt information to the display interface of the first communication terminal if the determination result of the first determining module is No, in which the communication connection request prompt information is prompt information corresponding to the initiation of the communication connection request to the second communication terminal or the reception of the communication connection request from the second communication terminal.

Preferably, the second obtaining module includes:

a determining module configured to determine a first corresponding relationship set stored in the first communication terminal, in which the first corresponding relationship set includes at least one corresponding relationship between a communication terminal identifier and associated information; and a first obtaining sub-module configured to search for the first associated information corresponding to the identifier of the second communication terminal according to the identifier of the second communication terminal and the first corresponding relationship set.

Preferably, the second obtaining module includes:

a corresponding relationship obtaining module configured to obtain a second corresponding relationship set stored in the first communication terminal, in which the second corresponding relationship set includes at least one corresponding relationship between a communication terminal identifier and a network identifier;

a searching module configured to search for a network identifier corresponding to the identifier of the second communication terminal according to the identifier of the second communication terminal and the second corresponding relationship set; and a second obtaining sub-module configured to obtain the first associated information corresponding to the network identifier according to the network identifier.

Preferably, the device further includes:

a second determining module configured to determine whether an information acquiring request satisfies a second predetermined condition in the case that the information acquiring request is detected; and a third obtaining module configured to obtain second associated information corresponding to the identifier of the second communication terminal according to the identifier of the second communication terminal or the first associated information, if a determination result of the second determining module is Yes, and in which the output module is further configured to output the second associated information to the display interface of the first communication terminal.

Preferably, the second obtaining module includes:

a third obtaining sub-module configured to obtain an associated information set corresponding to the identifier of the second communication terminal according to the identifier of the second communication terminal; and a selecting module configured to select the first associated information from the associated information set in accordance with a preset rule.

Preferably, the device further includes:

a third determining module configured to determine whether a communication connection with the second communication terminal is established successfully, and in which the output module is further configured to output the first associated information to the display interface continuously and output communication procedure prompt information after the establishment of the communication connection with the display interface simultaneously, if a determination result of the third determining module is Yes.

It is known from the above-mentioned technical solution that, compared with the prior art, the present invention discloses an information output method and device. In this solution, when a communication connection request is initiated to a second communication terminal or a communication connection request is received from the second communication terminal, an identifier of a second communication terminal and first associated information corresponding to the identifier of the second communication terminal are obtained, and then the first associated information and communication connection request prompt information are output to a display interface to be displayed, in which the first associated information is information different from the communication connection request prompt information. Therefore, a time is employed sufficiently, and the utilization of the terminal is enhanced, and the user experience is improved. Moreover, the communication effect of both communication sides is increased after the establishment of the communication channel.

BRIEF DESCRIPTION OF THE DRAWINGS

The accompanying drawings needed to be used in the description of the embodiments or the prior art will be described briefly as follows, so that the technical solutions according to the embodiments of the present invention or according to the prior art will become clearer. It is obvious that the accompanying drawings in the following description are only some embodiments of the present invention. For those skilled in the art, other accompanying drawings may be obtained according to these accompanying drawings without any creative work.

DETAILED DESCRIPTION OF THE INVENTION

The technical solution according to the embodiments of the present invention will be described clearly and completely as follows in conjunction with the accompanying drawings in the embodiments of the present invention. It is obvious that the described embodiments are only a part of the embodiments according to the present invention. All the other embodiments obtained by those skilled in the art based on the embodiments in the present invention without any creative work belong to the scope of the present invention.

The present invention discloses an information output method and device. In this solution, when a communication connection request is initiated to a second communication terminal or a communication connection request is received from the second communication terminal, an identifier of a second communication terminal and first associated information corresponding to the identifier of the second communication terminal are obtained, and then the first associated information and communication connection request prompt information are output to a display interface to be displayed, in which the first associated information is information different from the communication connection request prompt information. Therefore, a time is employed sufficiently, and the utilization of the terminal is enhanced, and a user experience is improved. Moreover, the communication effect of both communication sides is increased after the establishment of a communication channel.

Figure 1:
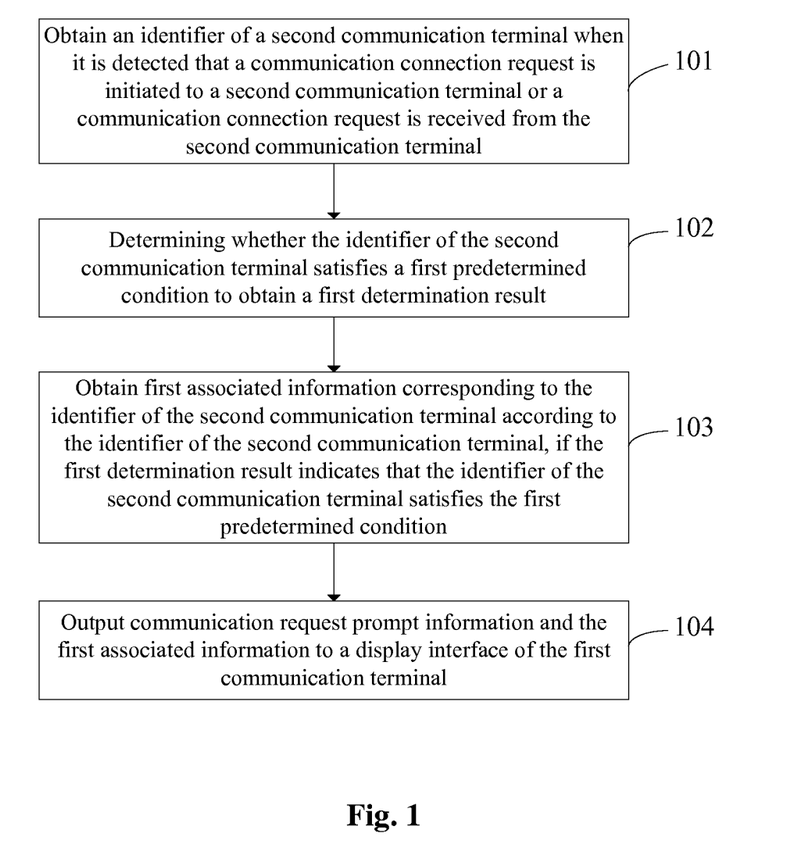
FIG. 1 is a flowchart of a first embodiment of an information output method according to the present invention.

Referring to FIG. 1, a flowchart of a first embodiment of an information output method according to the present invention is shown. The method is applied to a first communication terminal and may include the following steps.

Step 101: obtaining an identifier of a second communication terminal in the case that it is detected that a communication connection request is initiated to a second communication terminal or a communication connection request is received from the second communication terminal.

The communication connection request is a request for establishing a communication channel to achieve the communication.

A communication connection request is initiated to a second communication terminal, i.e., an outgoing call request is initiated to the second communication terminal. The communication connection request is received from the second communication terminal, i.e., an incoming call request is received from the second communication terminal. The call request includes a call request of a voice communication and a call request of a video communication. Furthermore, the call request may be based on a mobile communication network such as a network of 2G, 3G, and 4G, or may also be based on the internet, which is not limited thereto in the embodiment.

In the embodiment, once initiating an outgoing call request or receiving an incoming call request, the first communication terminal may all obtain an identifier of a second communication terminal corresponding to an outgoing call side or an incoming call side. The identifier of the communication terminal may be a communication identifier such as a cell phone number, a register identifier of a communication software, or a register mailbox of a communication software.

Step 102: determining whether the identifier of the second communication terminal satisfies a first predetermined condition to obtain a first determination result.

The first predetermined condition may be that the identifier of the second communication terminal is prestored, for example in an address list of the first communication terminal. Therefore, the determining whether the identifier of the second communication terminal satisfies a first predetermined condition may include: determining whether the identifier of the second communication terminal is stored.

Step 103: obtaining first associated information corresponding to the identifier of the second communication terminal according to the identifier of the second communication terminal, in the case that the first determination result indicates that the identifier of the second communication terminal satisfies the first predetermined condition.

The first associated information corresponding to the identifier of the second communication terminal may be obtained by multiple ways, which will be described in detail in the following embodiments.

There may be multiple pieces of associated information corresponding to the identifier of the second communication terminal, i.e. initial associated information. Therefore, in particular, it is possible to obtain an associated information set corresponding to the identifier of the second communication terminal according to the identifier of the second communication terminal, in which the associated information set includes the initial associated information. Then, the first associated information is selected from the associated information set in accordance with a preset rule.

The selection of the first associated information from the associated information set in accordance with the preset rule may be performed in accordance with an arrangement rule which is set based on a priority of the initial associated information. The priority of the initial associated information may be set according to the importance degree of the information or the time sequence of sending of the information.

Step 104: outputting communication connection request prompt information and the first associated information to a display interface of the first communication terminal. The communication connection request prompt information is prompt information corresponding to the initiation of the communication connection request to the second communication terminal or prompt information corresponding to the reception of the communication connection request from the second communication terminal.

The operation of the step 104 is to output the communication connection request prompt information of a communication connection and the obtained first associated information to the display interface of the first communication terminal, once the initiation of the communication connection request to the second communication terminal or the reception of the communication connection request from the second communication terminal is detected.

The communication connection request prompt information may include the identifier of the second communication terminal, a user name corresponding to the prestored identifier of the second communication terminal, communication request operation information and/or communication request auxiliary information. The communication request operation information is information related to the communication connection, which may be identifier information for prompting whether functions of silence, hands-free, refusing, transferring, holding calls and the like are opened, so that a user may trigger a corresponding operation according to the communication request operation information. The communication request auxiliary information is information related to the communication connection, which may be used to assist a user to know the information directly associated with the identifier of the communication terminal. For example, in a case that the identifier of the second communication terminal is a communication identifier, the communication request auxiliary information may include information such as a telephone number location and a telephone number operator.

The first associated information described in the embodiment of the present invention is information different from the communication connection request prompt information. The first associated information may include stored history information corresponding to the identifier of the second communication terminal, such as call history information, short message history information and mail history information; and/or behavior history information corresponding to the identifier of the second communication terminal, such as the time for sending or receiving a short message, the latest time for sending a communication connection request, whether there is an unread mail; and/or network information corresponding to the identifier of the second communication terminal and stored on a network side, in which the network information may be information in a register webpage corresponding to the identifier of the second communication terminal, such as blog information in a blog page, space living information in a social website page and information contained in a web page of another portal website.

After the first associated information is determined, the first associated information together with the communication connection request prompt information may be output to the display interface of the first communication terminal, so that the communication connection request prompt information and the first associated information may be displayed simultaneously on the display interface.

The first associated information may be displayed in a rolling way, i.e. in a rolling way at a specific region of the display interface.

In the case of multiple pieces of initial associated information corresponding to the identifier of the second communication terminal, is the method can further include: extracting key words of each of the multiple pieces of initial associated information, and output the key words to the display interface as the first associated information, and using the initial associated information corresponding to the key words as the second associated information. The first associated information corresponding to the key word is outputted after an acquiring request is received from a user.

Therefore, after the communication connection request prompt information and the first associated information are displayed on the display interface, the method may further include:

determining whether an information acquiring request satisfies a second predetermined condition to obtain a second determination result when the information acquiring request is detected; and obtaining second associated information corresponding to the identifier of the second communication terminal according to the identifier of the second communication terminal or the first associated information, if the second determination result indicates that the information acquiring request satisfies the second predetermined condition.

The second associated information may be a content of the first associated information, i.e. the initial associated information.

Due to the limitation of the display interface, the initial associated information corresponding to the identifier of the second communication terminal may not be presented integrally. Accordingly, one or a limited number of pieces of the initial associated information, i.e. the first associated information, can be displayed at present. Therefore, the second associated information may also be the initial associated information which corresponds to the identifier of the second communication terminal and is not displayed on the display interface.

The step of determining whether an information acquiring request satisfies the second predetermined condition may include: determining whether the operation for triggering the information acquiring request is a preset operation. For example, it is preset that a triggering of a certain button means a request for obtaining the second associated information. Thus, it is indicated that an information acquiring request satisfies a second predetermined condition if it is determined that a triggering operation of a user is to trigger the button.

In the embodiment, the first associated information is displayed when a communication connection to the second communication terminal is not established.

Therefore, for another embodiment, the method may further include:

determining whether a communication connection to the second communication terminal is established successfully; and if the communication connection to the second communication terminal is established successfully, outputting the first associated information to the display interface continuously while communication procedure prompt information after the establishment of the communication connection is output to the display interface.

That is, after the communication connection to the second communication terminal is established, the first associated information may be continuously displayed on the display interface, while communication procedure prompt information, such as duration of a call and other related information, is displayed on the display interface.

As for the other embodiment, the method may further include:

determining whether a communication connection to the second communication terminal is established successfully; and if the communication connection to the second communication terminal is established successfully, stopping the output of the first associated information.

That is, after the communication connection is established, the first associated information is not displayed on the display interface.

The embodiment includes: obtaining an identifier of a second communication terminal and first associated information corresponding to the identifier of the second communication terminal when a communication connection request is initiated to a second communication terminal or a communication connection request is received from the second communication terminal, and then outputting the first associated information and communication connection request prompt information to a display interface to display them, in which the first associated information is information different from the communication connection request prompt information. Therefore, time is employed sufficiently, and the utilization of the terminal is enhanced, and the user experience is improved. Moreover, it may help a user to obtain information of a communication history or the recent state and behavior information of the other communication side and the like, so as to increase the communication effect of both communication sides after the establishment of a communication channel.

Figure 2:
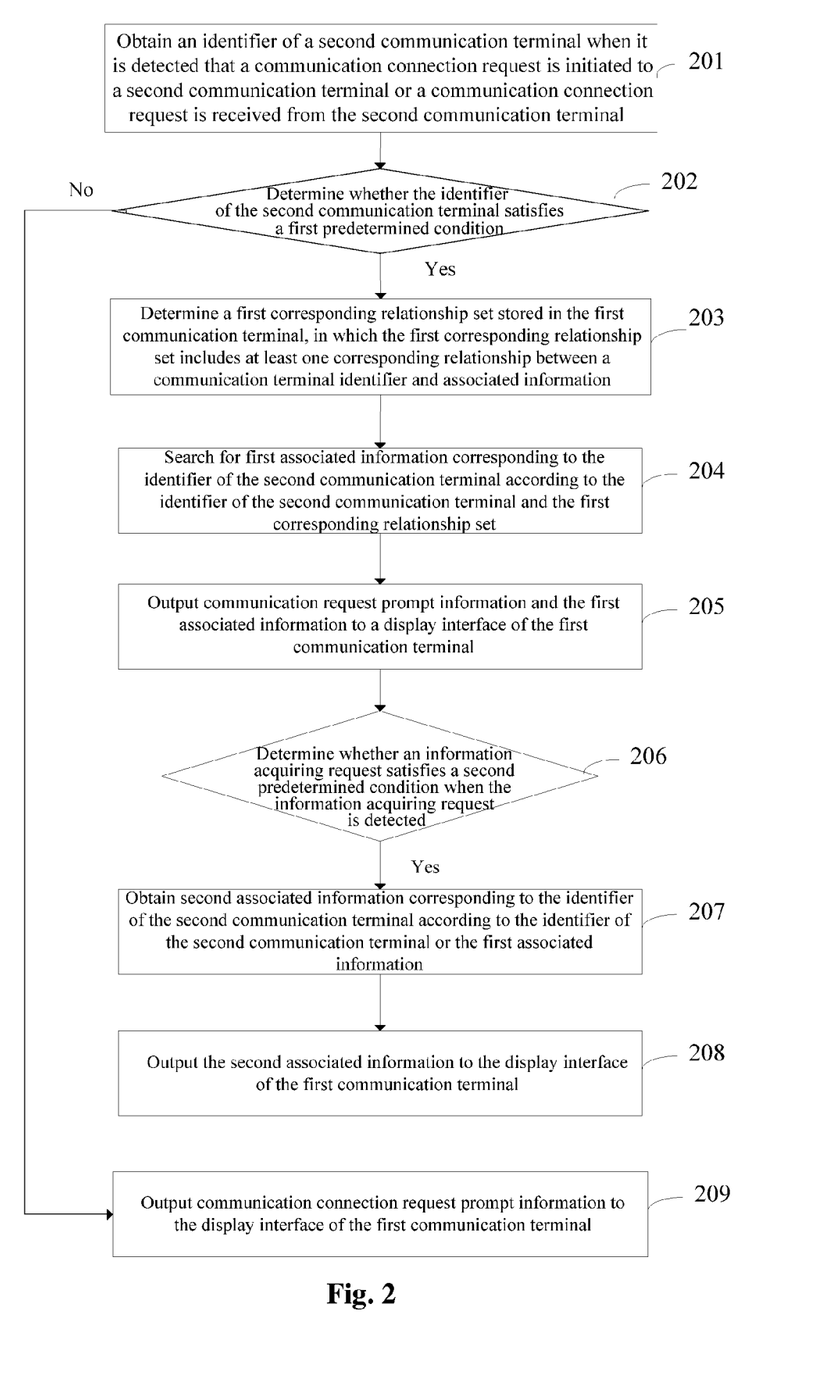
FIG. 2 is a flowchart of a second embodiment of the information output method according to the present invention.

Reference is made to FIG. 2 which shows a flowchart of a second embodiment of the information output method according to the present invention. The method may include the following steps.

Step 201: obtaining an identifier of a second communication terminal when it is detected that a communication connection request is initiated to a second communication terminal or a communication connection request is received from the second communication terminal.

Step 202: determining whether the identifier of the second communication terminal satisfies a first predetermined condition, and if the identifier of the second communication terminal satisfies the first predetermined condition, the process proceeds to Step 203; otherwise, the process proceeds to Step 209.

Step 203: determining a first corresponding relationship set stored in the first communication terminal, in which the first corresponding relationship set includes at least one corresponding relationship between a communication terminal identifier and associated information.

The corresponding relationship between the communication terminal identifier and the associated information may be prestored in the first communication terminal, and one communication terminal identifier may correspond to multiple pieces of associated information. The corresponding relationship between the communication terminal identifier and the associated information forms the first corresponding relationship set.

The associated information described in the embodiment may be stored history information corresponding to the identifier of the second communication terminal, such as call history information, short messages history information and mail history information.

Certainly, the first corresponding relationship set may also be stored on a network side, so that the first corresponding relationship may be obtained by accessing the network side.

Step 204: searching for first associated information corresponding to the identifier of the second communication terminal according to the identifier of the second communication terminal and the first corresponding relationship set.

After the first corresponding relationship set is determined, the first associated information corresponding to the identifier of the second communication terminal can be searched from the first corresponding relationship set.

There may be multiple pieces of associated information corresponding to the identifier of the second communication terminal, i.e. initial associated information. Thus, the initial associated information may be screened in accordance with a preset rule, so as to select one or multiple or all pieces of the initial associated information as the first associated information.

In an embodiment, the step for screening the initial associated information in accordance with a preset rule may include the following steps.

Firstly, a priority for each of the multiple pieces of initial associated information is set respectively The priority may particularly be defined according to the happening time of the initial associated information, if the initial associated information is the stored history information corresponding to the identifier of the second communication terminal.

Next, preset number pieces of initial associated information are selected as the first associated information according to the order of the prior from high to low.

Step 205: outputting communication connection request prompt information and the first associated information to a display interface of the first communication terminal. The communication connection request prompt information is prompt information corresponding to the initiation of the communication connection request to the second communication terminal or the reception of the communication connection request from the second communication terminal.

Step 206: determining whether an information acquiring request satisfies a second predetermined condition when the information acquiring request is detected, and if the information acquiring request satisfies the second predetermined condition, the process proceeds to Step 207.

Step 207: obtaining second associated information corresponding to the identifier of the second communication terminal according to the identifier of the second communication terminal r or the first associated information.

Step 208: outputting the second associated information to the display interface of the first communication terminal.

Step 209: outputting the communication connection request prompt information to the display interface of the first communication terminal.

The communication connection request prompt information is prompt information corresponding to the initiation of the communication connection request to the second communication terminal or the reception of the communication connection request from the second communication terminal.

The embodiment includes: obtaining an identifier of a second communication terminal identifier and first associated information corresponding to the identifier of the second communication terminal when a communication connection request is initiated to a second communication terminal or a communication connection request is received from the second communication terminal, and then outputting the first associated information and communication connection request prompt information to a display interface to display them, in which the first associated information is information different from the communication connection request prompt information. Therefore, the time is employed sufficiently, and the utilization of the terminal is enhanced, and the user experience is improved. Moreover, the communication effect of both communication sides is increased after the establishment of the communication channel.

Figure 3:
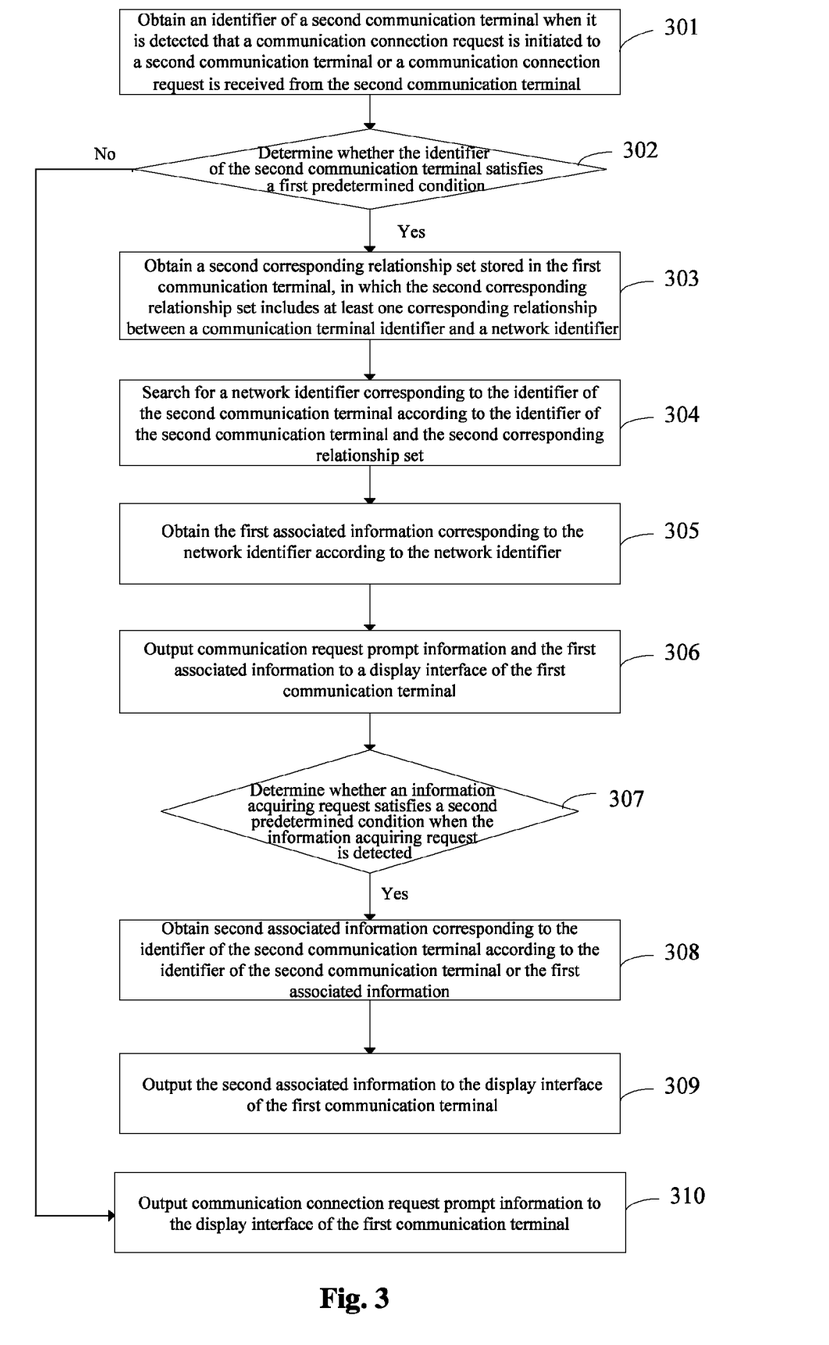
FIG. 3 is a flowchart of a third embodiment of the information output method according to the present invention.

Reference is made to FIG. 3 which shows a flowchart of a third embodiment of the information output method of the present invention. The method may include the following steps.

Step 301: obtaining an identifier of a second communication terminal when it is detected that a communication connection request is initiated to a second communication terminal or a communication connection request is received from the second communication terminal.

Step 302: determining whether the identifier of the second communication terminal satisfies a first predetermined condition, and if the identifier of the second communication terminal satisfies the first predetermined condition, the process proceeds to Step 303; otherwise, the process proceeds to Step 310.

Step 303: obtaining a second corresponding relationship set stored in the first communication terminal, in which the second corresponding relationship set includes at least one corresponding relationship between a communication terminal identifier and a network identifier.

The network identifier may represent network identity information of a user who uses the communication terminal, such as a registered account. The network identifier may also be a stored website accessed by a user who uses the communication terminal, and the like.

The second corresponding relationship set may be an address list, for example, which prestores a corresponding relationship between the communication terminal identifier and the network identifier. The network identifier may be for example an IM (Instant Messenger) account, a blog address and the like. Each of communication terminal identifier may correspond to multiple network identifiers, such that the second corresponding relationship set includes at least one corresponding relationship between a communication terminal identifier and a network identifier.

Step 304: searching for a network identifier corresponding to the identifier of the second communication terminal according to the identifier of the second communication terminal and the second corresponding relationship set.

Step 305: obtaining the first associated information corresponding to the network identifier according to the network identifier.

The first associated information is network information. For example, if the network identifier is an IM account, the first associated information is an instant message sent by the IM account; if the network identifier is a blog account, the first associated information is blog information issued by a user who uses the second communication terminal; and if the network identifier is a website, the first associated information is a message issued by a webpage in which a user applying the second communication terminal is interested.

Certainly, there may be multiple pieces of associated information corresponding to the network identifier, i.e. initial associated information. In this way, the initial associated information may be screened in accordance with a preset rule firstly.

Step 306: outputting communication connection request prompt information and the first associated information to a display interface of the first communication terminal.

The communication connection request prompt information is prompt information corresponding to the initiation of the communication connection request to the second communication terminal or the reception of the communication connection request from the second communication terminal.

Step 307: determining whether an information acquiring request satisfies a second predetermined condition when the information acquiring request is detected, and if the information acquiring request satisfies the second predetermined condition, the process proceeds to Step 308.

Step 308: obtaining second associated information corresponding to the identifier of the second communication terminal according to the identifier of the second communication terminal or the first associated information.

Step 309: outputting the second associated information to the display interface of the first communication terminal.

Step 310: outputting the communication connection request prompt information to the display interface of the first communication terminal.

In the embodiment, the method includes: obtaining an identifier of a second communication terminal identifier and determining a network identifier corresponding to the identifier of the second communication terminal to obtain first associated information corresponding to the network identifier when a communication connection request is initiated to a second communication terminal or a communication connection request is received from the second communication terminal, and then outputting the first associated information and communication connection request prompt information to a display interface to display them, in which the first associated information is information different from the communication connection request prompt information. Therefore, time is employed sufficiently, and the utilization of the terminal is enhanced, and the user experience is improved. Moreover, the communication effect of both communication sides is increased after the establishment of the communication channel.

Figure 4:
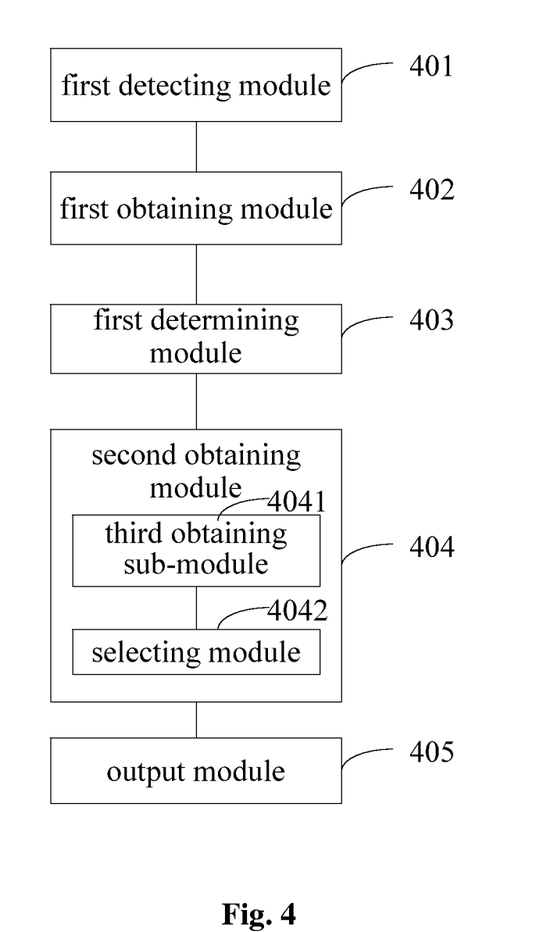
FIG. 4 is a structural schematic diagram of a first embodiment of an information output device according to the present invention.

Reference is made to FIG. 4 which shows a structural schematic diagram of a first embodiment of an information output device according to the present invention. The device may be applied to a first communication terminal and may include:

a first detecting module 401 configured to detect whether a communication connection request is initiated to a second communication terminal or whether a communication connection request is received from the second communication terminal;

a first obtaining module 402 configured to obtain an identifier of a second communication terminal identifier, if a detection result of the first detecting module is Yes;

a first determining module 403 configured to determine whether the identifier of the second communication terminal satisfies a first predetermined condition;

a second obtaining module 404 configured to obtain first associated information corresponding to the identifier of the second communication terminal according to the identifier of the second communication terminal if a determination result of the first determining module is Yes, Particularly, the second obtaining module 404 may include:

a third obtaining sub-module 4041 configured to obtain an associated information set corresponding to the identifier of the second communication terminal according to the identifier of the second communication terminal; and a selecting module 4042 configured to select the first associated information from the associated information set in accordance with a preset rule.

The device can further include an output module 405 configured to output communication connection request prompt information and the first associated information to a display interface of the first communication terminal, in which the communication connection request prompt information is prompt information corresponding to the initiation of the communication connection request to the second communication terminal or the reception of the communication connection request from the second communication terminal.

In the embodiment, an identifier of a second communication terminal and first associated information corresponding to the identifier of the second communication terminal are obtained when a communication connection request is initiated to a second communication terminal or a communication connection request is received from the second communication terminal. Then, the first associated information and communication connection request prompt information are output to a display interface to display them, in which the first associated information is information different from the communication connection request prompt information. Therefore, time is employed sufficiently, and the utilization of the terminal is enhanced, and the user experience is improved. Moreover, the communication effect of both communication sides is increased after the establishment of the communication channel.

Figure 5:
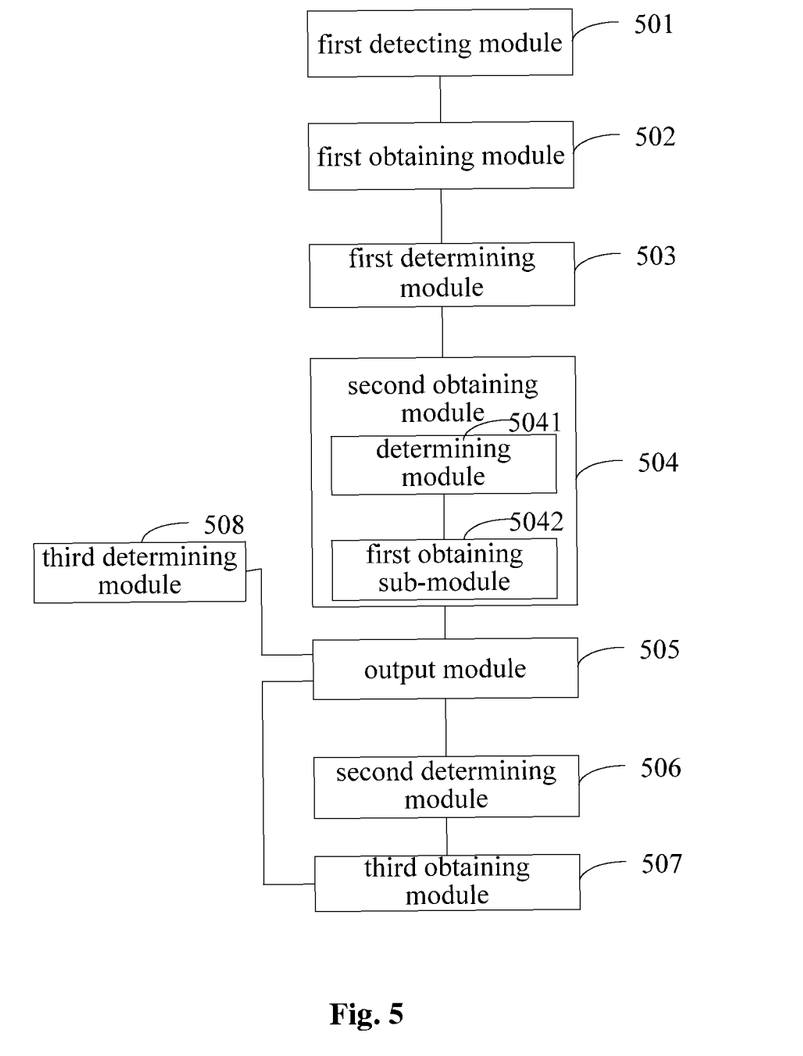
FIG. 5 is a structural schematic diagram of a second embodiment of the information output device according to the present invention.

Reference is made to FIG. 5 which shows a structural schematic diagram of a second embodiment of the information output device according to the present invention. The device may be applied to a first communication terminal and may include the following modules.

A first detecting module 501 is configured to detect whether a communication connection request is initiated to a second communication terminal or whether a communication connection request is received from the second communication terminal.

A first obtaining module 502 is configured to obtain an identifier of a second communication terminal, if a detection result of the first detecting module is Yes.

A first determining module 503 is configured to determine whether the identifier of the second communication terminal satisfies a first predetermined condition.

A second obtaining module 504 is configured to obtain first associated information corresponding to the identifier of the second communication terminal according to the identifier of the second communication terminal if a determination result of the first determining module is Yes.

The second obtaining module 504 includes:

a determining module 5041 configured to determine a first corresponding relationship set stored in the first communication terminal, in which the first corresponding relationship set includes at least one corresponding relationship between a communication terminal identifier and associated information; and a first obtaining sub-module 5042 configured to search for the first associated information corresponding to the identifier of the second communication terminal according to the identifier of the second communication terminal and the first corresponding relationship set;

An output module 505 is configured to output communication connection request prompt information and the first associated information to a display interface of the first communication terminal, in which the communication connection request prompt information is prompt information corresponding to the initiation of the communication connection request to the second communication terminal or the reception of the communication connection request from the second communication terminal.

A second determining module 506 is configured to determine whether an information acquiring request satisfies a second predetermined condition when the information acquiring request is detected.

A third obtaining module 507 is configured to obtain second associated information corresponding to the identifier of the second communication terminal according to the identifier of the second communication terminal or the first associated information, if a determination result of the second determining module is Yes.

The output module 505 is further configured to output the second associated information to the display interface of the first communication terminal.

A third determining module 508 is configured to determine whether a communication connection to the second communication terminal is established successfully, The output module 505 is further configured to output the first associated information to the display interface continuously, while communication procedure prompt information after the establishment of the communication connection is outputted to the display interface, if a determination result of the third determining module is Yes.

In the embodiment, an identifier of a second communication terminal and first associated information corresponding to the identifier of the second communication terminal are obtained when a communication connection request is initiated to a second communication terminal or a communication connection request is received from the second communication terminal. Then, the first associated information and communication connection request prompt information are output to a display interface to display them, in which the first associated information is information different from the communication connection request prompt information. Therefore, the time is employed sufficiently, and the utilization of the terminal is enhanced, and the user experience is improved. Moreover, the communication effect of both communication sides is increased after the establishment of the communication channel.

Figure 6:
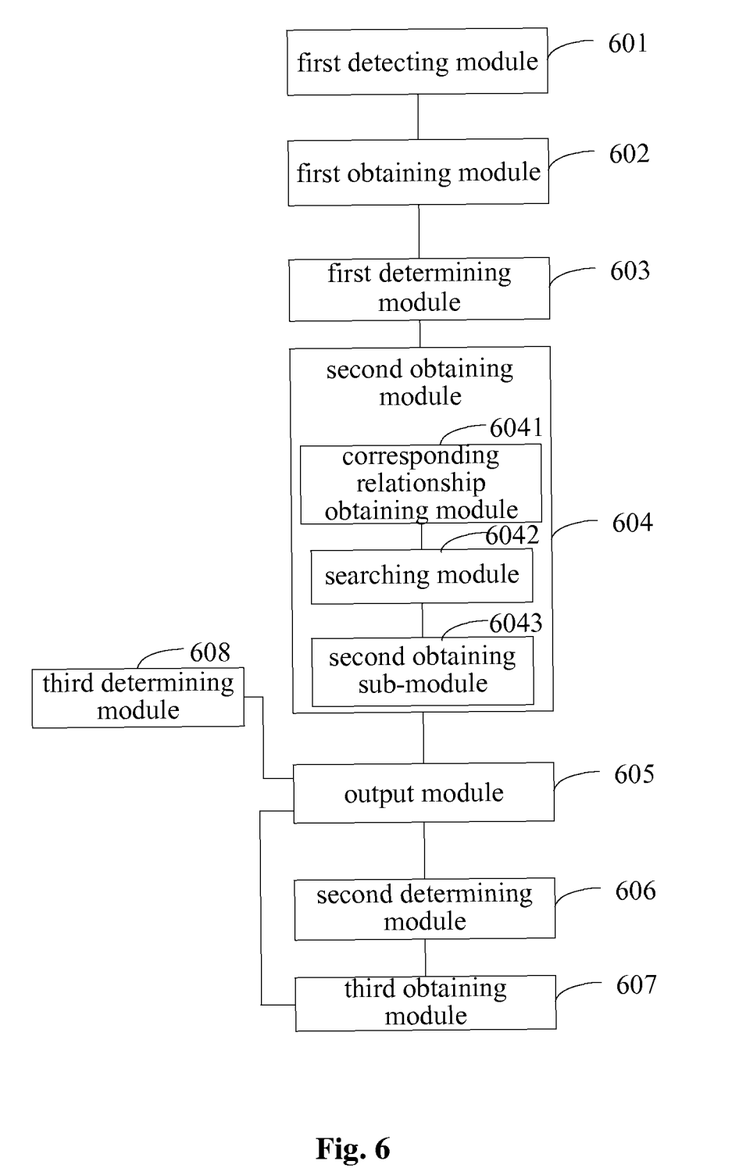
FIG. 6 is a structural schematic diagram of a third embodiment of the information output device according to the present invention.

Reference is made to FIG. 6 which shows a structural schematic diagram of a third embodiment of the information output device according to the present invention. The device may be applied to a first communication terminal and may include the following modules.

A first detecting module 601 is configured to detect whether a communication connection request is initiated to a second communication terminal or whether a communication connection request is received from the second communication terminal.

A first obtaining module 602 is configured to obtain an identifier of a second communication terminal identifier, if a detection result of the first detecting module is Yes.

A first determining module 603 is configured to determine whether the identifier of the second communication terminal satisfies a first predetermined condition.

A second obtaining module 604 is configured to obtain first associated information corresponding to the identifier of the second communication terminal according to the identifier of the second communication terminal, if a determination result of the first determining module is Yes.

The second obtaining module 604 includes:

a corresponding relationship obtaining module 6041 configured to obtain a second corresponding relationship set stored in the first communication terminal, in which the second corresponding relationship set includes at least one corresponding relationship between a communication terminal identifier and a network identifier;

a searching module 6042 configured to search for a network identifier corresponding to the identifier of the second communication terminal according to the identifier of the second communication terminal and the second corresponding relationship set; and a second obtaining sub-module 6043 configured to obtain the first associated information corresponding to the network identifier according to the network identifier;

An output module 605 is configured to output communication connection request prompt information and the first associated information to a display interface of the first communication terminal, in which the communication connection request prompt information is prompt information corresponding to the initiation of the communication connection request to the second communication terminal or the reception of the communication connection request from the second communication terminal.

A second determining module 606 is configured to determine whether an information acquiring request satisfies a second predetermined condition when the information acquiring request is detected.

A third obtaining module 607 is configured to obtain second associated information corresponding to the identifier of the second communication terminal according to the identifier of the second communication terminal or the first associated information, if a determination result of the second determining module is Yes.

The output module 605 is further configured to output the second associated information to the display interface of the first communication terminal.

A third determining module 608 is configured to determine whether a communication connection to the second communication terminal is established successfully.

The output module 605 is further configured to output the first associated information to the display interface continuously, while communication procedure prompt information after the establishment of the communication connection is outputted to the display interface, if a determination result of the third determining module is Yes.

In the embodiment, an identifier of a second communication terminal is obtained and the network identifier corresponding to the identifier of the second communication terminal is determined to obtain first associated information corresponding to the network identifier, when a communication connection request is initiated to a second communication terminal or a communication connection request is received from the second communication terminal. Then, the first associated information and communication connection request prompt information are output to a display interface to display them, in which the first associated information is information different from the communication connection request prompt information. Therefore, the time is employed sufficiently, and the utilization of the terminal is enhanced, and the user experience is improved. Moreover, the communication effect of both communication sides after the establishment of the communication channel.

The embodiments of the present invention are described herein in a progressive manner, with the emphasis of each of the embodiments on the difference between it and the other embodiments; hence, for the same or similar parts between the embodiments, one can refer to the other embodiments. For the devices disclosed in the embodiments, they are described simply because they correspond to the methods disclosed in the embodiments, so for the related information, one can refer to the part of the method description.

The above description of the embodiments disclosed herein enables those skilled in the art to implement or use the present invention. Numerous modifications to the embodiments will be apparent to those skilled in the art, and the general principle herein can be implemented in other embodiments without deviation from the spirit or scope of the embodiments of the present invention. Therefore, the present invention will not be limited to the embodiments described herein, but in accordance with the widest scope consistent with the principle and novel features disclosed herein.

The invention claimed is:

1. An information output method applied to a first communication terminal, comprising:
    obtaining an identifier of a second communication terminal identifier in the case that it is detected that a communication connection request is initiated to a second communication terminal or a communication connection request is received from the second communication terminal;
    determining whether the identifier of the second communication terminal satisfies a first predetermined condition to obtain a first determination result;
    obtaining first associated information corresponding to the identifier of the second communication terminal according to the identifier of the second communication terminal, if the first determination result indicates that the identifier of the second communication terminal satisfies the first predetermined condition; and
    outputting communication connection request prompt information and the first associated information to a display interface of the first communication terminal, wherein the communication connection request prompt information is prompt information corresponding to the initiation of the communication connection request to the second communication terminal or the reception of the communication connection request from the second communication terminal; and
    wherein if the first determination result indicates that the identifier of the second communication terminal does not satisfy the first predetermined condition, the method further comprises: outputting communication connection request prompt information to the display interface of the first communication terminal, wherein the communication connection request prompt information is prompt information corresponding to the initiation of the communication connection request to the second communication terminal or the reception of the communication connection request from the second communication terminal.

2. The method according to claim 1, wherein the determining whether the identifier of the second communication terminal satisfies a first predetermined condition to obtain a first determination result comprises:
    determining whether the identifier of the second communication terminal is stored to obtain the first determination result.

3. The method according to claim 1, wherein the obtaining first associated information corresponding to the identifier of the second communication terminal according to the identifier of the second communication terminal comprises:
    determining a first corresponding relationship set stored in the first communication terminal, wherein the first corresponding relationship set comprises at least one corresponding relationship between a communication terminal identifier and associated information; and
    searching for the first associated information corresponding to the identifier of the second communication terminal according to the identifier of the second communication terminal and the first corresponding relationship set.

4. The method according to claim 1, wherein the obtaining first associated information corresponding to the identifier of the second communication terminal according to the identifier of the second communication terminal comprises:

obtaining a second corresponding relationship set stored in the first communication terminal, wherein the second corresponding relationship set comprises at least one corresponding relationship between a communication terminal identifier and a network identifier;

searching for a network identifier corresponding to the identifier of the second communication terminal according to the identifier of the second communication terminal and the second corresponding relationship set; and obtaining the first associated information corresponding to the network identifier according to the network identifier.

5. The method according to claim 1, wherein after the outputting communication connection request prompt information and the first associated information to a display interface of the first communication terminal, the method further comprises:

determining whether an information acquiring request satisfies a second predetermined condition to obtain a second determination result in the case that the information acquiring request is detected;

obtaining second associated information corresponding to the identifier of the second communication terminal according to the identifier of the second communication terminal or the first associated information, if the second determination result indicates that the information acquiring request satisfies the second predetermined condition; and outputting the second associated information to the display interface of the first communication terminal.

6. The method according to claim 1, wherein the obtaining first associated information corresponding to the identifier of the second communication terminal according to the identifier of the second communication terminal comprises:

obtaining an associated information set corresponding to the identifier of the second communication terminal according to the identifier of the second communication terminal; and selecting the first associated information from the associated information set in accordance with a preset rule.

7. The method according to claim 1, further comprising:

determining whether a communication connection with the second communication terminal is established successfully; and if the communication connection with the second communication terminal is established successfully, outputting the first associated information to the display interface continuously and outputting communication procedure prompt information after the establishment of the communication connection with the display interface simultaneously.

8. An information output device applied to a first communication terminal, comprising:

a first detecting module configured to detect whether a communication connection request is initiated to a second communication terminal or a communication connection request is received from the second communication terminal;

a first obtaining module configured to obtain an identifier of a second communication terminal, if a detection result of the first detecting module is Yes;

a first determining module configured to determine whether the identifier of the second communication terminal satisfies a first predetermined condition;

a second obtaining module configured to obtain first associated information corresponding to the identifier of the second communication terminal according to the identifier of the second communication terminal, if a determination result of the first determining module is Yes; and an output module configured to output communication connection request prompt information and the first associated information to a display interface of the first communication terminal, wherein the communication connection request prompt information is prompt information corresponding to the initiation of the communication connection request to the second communication terminal or the reception of the communication connection request from the second communication terminal, wherein the output module is further configured to output the communication connection request prompt information to the display interface of the first communication terminal if the determination result of the first determining module is No, wherein the communication connection request prompt information is prompt information corresponding to the initiation of the communication connection request to the second communication terminal or the reception of the communication connection request from the second communication terminal.

9. The device according to claim 8, wherein the first determining module is configured to determine whether the identifier of the second communication terminal is stored.

10. The device according to claim 8, wherein the second obtaining module comprises:

a determining module configured to determine a first corresponding relationship set stored in the first communication terminal, wherein the first corresponding relationship set comprises at least one corresponding relationship between a communication terminal identifier and associated information; and a first obtaining sub-module configured to search for the first associated information corresponding to the identifier of the second communication terminal according to the identifier of the second communication terminal and the first corresponding relationship set.

11. The device according to claim 8, wherein the second obtaining module comprises:

a corresponding relationship obtaining module configured to obtain a second corresponding relationship set stored in the first communication terminal, wherein the second corresponding relationship set comprises at least one corresponding relationship between a communication terminal identifier and a network identifier;

a searching module configured to search for a network identifier corresponding to the identifier of the second communication terminal according to the identifier of the second communication terminal and the second corresponding relationship set; and a second obtaining sub-module configured to obtain the first associated information corresponding to the network identifier according to the network identifier.

12. The device according to claim 8, further comprising:

a second determining module configured to determine whether an information acquiring request satisfies a second predetermined condition in the case that the information acquiring request is detected; and a third obtaining module configured to obtain second associated information corresponding to the identifier of the second communication terminal according to the identifier of the second communication terminal or the first associated information, if a determination result of the second determination module is Yes, and wherein the output module is further configured to output the second associated information to the display interface of the first communication terminal.

13. The device according to claim 8, wherein the second obtaining module comprises:
   a third obtaining sub-module configured to obtain an associated information set corresponding to the identifier of the second communication terminal according to the identifier of the second communication terminal; and
   a selecting module configured to select the first associated information from the associated information set in accordance with a preset rule.

14. The device according to claim 8, further comprising:
   a third determining module configured to determine whether a communication connection with the second communication terminal is established successfully, and wherein
   the output module is further configured to output the first associated information to the display interface continuously and output communication procedure prompt information after the establishment of the communication connection with the display interface to the display interface simultaneously, if a determination result of the third determining module is Yes.

* * * * *